United States Patent [19]

Fisch et al.

[11] Patent Number: 5,055,516

[45] Date of Patent: Oct. 8, 1991

[54] PREPARATION OF EMULSIFIER-FREE AQUEOUS POLYURETHANE DISPERSIONS

[75] Inventors: Herbert Fisch, Wachenheim; Lothar Maempel, Bruehl; Otto Volkert, Weisenheim, all of Fed. Rep. of Germany

[73] Assignee: BASF Aktiengesellschaft, Ludwigshafen, Fed. Rep. of Germany

[21] Appl. No.: 462,039

[22] Filed: Jan. 8, 1990

[30] Foreign Application Priority Data

Feb. 7, 1989 [DE] Fed. Rep. of Germany ....... 3903538

[51] Int. Cl.$^5$ .......................... C08L 63/00; C08J 00/00
[52] U.S. Cl. .................................... 524/541; 524/591; 523/415
[58] Field of Search ................. 524/591, 541; 523/415

[56] References Cited

PUBLICATIONS

Polyurethane, Kunststoff-Handbuch, vol. 7, Jul. 1983, pp. 588-590, Dr. Gunter Oertel.

Die Angewandte Makromolekulare Chemie, vol. 98, (1981), pp. 133-165, D. Dietrich.
Progress in Organic Coatings, vol. 9, (1981), pp. 281-340, D. Dietrich.

Primary Examiner—Paul R. Michl
Assistant Examiner—Patrick Niland
Attorney, Agent, or Firm—Oblon, Spivak, McClelland, Maier & Neustadt

[57] ABSTRACT

Emulsifier-free aqueous polyurethane dispersions are prepared by reacting (a) dihydroxy compounds, (b) diisocyanates and (c) chain extenders to give a prepolymer having terminal isocyanate groups, then reacting the prepolymer with (d) salts of aliphatic aminocarboxylic or -sulfonic acids or amino-containing or hydroxyl-containing tertiary ammonium salts, dispersing the resulting polyurethane in water and, if required, removing the organic solvent by distillation. In the process, an organic condensation resin which is dissolved in a solvent is admixed before the polyurethane obtained is dispersed in water.

8 Claims, No Drawings

PREPARATION OF EMULSIFIER-FREE AQUEOUS POLYURETHANE DISPERSIONS

The present invention relates to a process for the preparation of emulsifier-free aqueous polyurethane dispersions by reacting (a) dihydroxy compounds having a molecular weight of from 500 to 5,000, (b) diisocyanates and (c) chain extenders having two or more hydrogen atoms which are reactive to isocyanate groups and having a molecular weight of less than 300, in the melt or in the presence of a water-miscible inert organic solvent (S) boiling below 100° C., to give a prepolymer having terminal isocyanate groups, then reacting the prepolymer, which may be dissolved in an organic solvent (S), with (d) salts of aliphatic aminocarboxylic or -sulfonic acids or amino-containing or hydroxyl-containing tertiary ammonium salts, which salts may be dissolved in water, dispersing the resulting polyurethane in water and, if required, removing the organic solvent by distillation.

The present invention furthermore relates to the use of the resulting products, ie. the elastomeric polyurethanes, as adhesives.

In this context, it should first be stated that it is known that the relevant polyurethane elastomers can be used as adhesives (cf. for example Kunststoff-Handbuch, Volume 7, July 1983, pages 588–590).

It is also known that the polyurethanes known to date as adhesives have the disadvantage of low solubility in suitable solvents (acetone and methyl ethyl ketone), so that large amounts of solvent have to be evaporated off during adhesive bonding. Attempts have therefore long been made to process elastomers in the form of aqueous dispersions (cf. for example the abovementioned Kunststoff-Handbuch, page 591 et seq.). The aqueous dispersions are usually stabilized by means of incorporated ionic groups. The disadvantage of these dispersions is that relatively high (80° C. or higher) activation temperatures are required during adhesive bonding, in order to bring the dried adhesive film to the consistency required for adhesive bonding, or that the initial adhesive strengths of the system which are obtained at a given activation temperature are too low. Initial adhesive strengths are the adhesive strengths measured directly after brief activation and pressing together of the surfaces to be adhesively bonded.

It is also known that, in the case of polyurethane adhesives which are processed from organic solution, the initial adhesive strength can be improved by adding certain resins (cf. for example D. Dietrich, Angew. Makromol. Chem. 98 (1981), 133–165). However, these resins are only soluble and effective in organic solvents. Mixing such resin solutions with aqueous polyurethane dispersions gives products without improved adhesive strength.

In the present context, it should also be stated that the preparation of aqueous polyurethane dispersions can be carried out in various ways (cf. for example D. Dietrich, Progress in Organic Coatings, 9 (1981), 281–340). The acetone process is relatively simple. In this process, the polyurethane ionomers are prepared in a plurality of steps in solution in acetone and then converted into an aqueous dispersion by adding water. The acetone still dissolved in the water is finally distilled off under reduced pressure.

Within this predetermined framework, it has now been observed, on the one hand, that adhesion-improving resins can be very simply introduced into the aqueous dispersion if a corresponding amount of an acetone solution of the relevant resin is added to the acetone solution of the polyurethane ionomer and then dispersed with water. This gives stable dispersions, the added resin being present in the interior of the disperse spheres while the stabilizing polyurethane ionomer layer is on the outside.

On the other hand, however, it has been found, in particular, that the dispersed added resin plays a decisive role in determining important properties of the adhesive layers.

Thus, it was possible in particular to increase the initial strength of polyurethane dispersion adhesives when from 5 to 60 parts by weight, based on 100 parts by weight of the polyurethane, of an organic condensation resin dissolved in a solvent boiling below 100° C., ie. an organic formaldehyde condensation resin of the phenol/formaldehyde condensate type, for example of the novolak or resol type, was admixed before the process of dispersing in water.

The present invention accordingly relates to a process for the preparation of emulsifier-free aqueous polyurethane dispersions by reacting (a) dihydroxy compounds having a molecular weight of from 500 to 5,000, (b) diisocyanates and (c) chain extenders having 2 or more hydrogen atoms which are reactive to isocyanate groups and having a molecular weight of less than 300, in the melt or in the presence of a water-miscible inert organic solvent (S) which boils below 100° C., to give a prepolymer having terminal isocyanate groups, then reacting the prepolymer, which may be dissolved in an organic solvent (S), with (d) salts of aliphatic aminocarboxylic or -sulfonic acids or amino-containing or hydroxyl-containing tertiary ammonium salts, which salts may be dissolved in water, dispersing the resulting polyurethane in water and, if required, removing the organic solvent by distillation.

In the novel process, from 5 to 60, in particular from 10 to 50, parts by weight, based on 100 parts by weight of the polyurethane, of an organic condensation resin dissolved in a solvent boiling below 100° C. is admixed before the polyurethane obtained is dispersed in water.

In a preferred variant of the novel process, a phenol/formaldehyde condensate is used as the organic condensation resin. Particularly suitable ones are those having weight average molecular weights ($\overline{M}w$) of from 500 to 3,000 and softening temperatures of from 80° to 150° C.

It has furthermore been found that epoxy/bisphenol A adducts, in particular those having weight average molecular weights ($\overline{M}w$) of from 500 to 2,000 and softening temperatures of from 80° to 130° C., can also be particularly successfully used as condensation resins for the purpose according to the invention.

The novel products are preferably employed as adhesives.

Regarding the novel process itself, the following may be stated specifically:

The polyurethane ionomers containing salt groups are prepared in a conventional manner by reacting (a) dihydroxy compounds having a molecular weight of from 500 to 5,000, (b) diisocyanates and (c) chain extenders having 2 or more hydrogen atoms which are reactive to isocyanate groups and having a molecular weight of less than 300, in the melt in the presence of a water-miscible inert organic solvent (S) boiling below 100° C., to give a prepolymer having terminal isocyanate groups, then reacting the prepolymer, which may be diluted with (further) solvent (S), with (d) water-soluble salts of aliphatic aminocarboxylic or -sulfonic acids having at least one hydrogen atom bonded to the nitrogen, which salts may be dissolved in water. Instead of the aminocarboxylic acid (anionic ionomer), it is also possible to use tertiary amines or salts thereof if they additionally contain groups having one or more hydrogen atoms which are reactive to isocyanate groups (cationic monomers). Thereafter, a 5–60% strength solution of the adhesion-improving resin in a water-miscible organic solvent boiling below 100° C. is added to the ionomer dissolved in the organic solvent, the resulting solution is dispersed by adding water and, if required, the organic solvent is removed by distillation.

Suitable dihydroxy compounds (a) having a molecular weight of from 500 to 5,000 are the known polyesters, polyethers, polythioethers, polylactones, polyacetals, polycarbonates and polyesteramides having 2 terminal hydroxyl groups. Preferred dihydroxy compounds are those whose molecular weight is from 750 to 3,000. It is of course also possible to use mixtures of these relatively high molecular weight dihydroxy compounds with one another.

Examples of suitable aliphatic, cycloaliphatic and aromatic diisocyanates (b) are butane 1,4-diisocyanate, hexane 1,6-diisocyanate, 2,2,4- and 2,4,4-trimethylhexamethylene diisocyanate, cyclohexane diisocyanate, methylcyclohexane diisocyanate, isophorone diisocyanate, 4,4,'-diisocyanatodiphenylmethane,4,4,'-diisocyanatodicyclohexylmethane and toluene 2,4- and 2,6-diisocyanate, and their industrial isomer mixtures. The molar ratio of the (cyclo)aliphatic diisocyanates to the aromatic diisocyanates is advantageously from 1:1 to 1:6.

Suitable chain extenders (c) having two or more hydrogen atoms which are reactive to isocyanate groups and having a molecular weight of less than 300 without salt groups are the conventional glycols, such as ethylene glycol, propylene glycol, butane-1,3-diol, butane-1,4-diol, hexanediol, neopentylglycol, cyclohexanediol, 2,2-bis-(4-hydroxycyclohexyl)-propane, 2,2-bis-(4-hydroxyethoxyphenyl)-propane, diethylene glycol or dipropylene glycol, diamines, such as ethylenediamine, piperazine, isophoronediamine, toluenediamine or diaminodiphenylmethane, and amino alcohols, hydrazine and, if necessary, also water.

Suitable water-soluble salts (d) of aliphatic aminocarboxylic or -sulfonic acids are described in, for example, German Laid-Open Applications DOS 2,034,479 or DOS 1,954,090. These are preferably the alkali metal salts, in particular the sodium or potassium salts, of the adducts of lower aliphatic diprimary diamines, eg. ethylenediamine, with unsaturated carboxylic acids, such as (meth)acrylic acid, crotonic acid or maleic acid, and alkali metal salts of lysine. Preferred compounds are in general those having two hydrogen atoms bonded to different nitrogen atoms and having only one salt group in the molecule, ie. compounds which render the product dispersible but not too hydrophilic and which are also suitable for chain extension. The alkali metal salts of the adducts of propanesulfonic acid with aliphatic diprimary diamines are also suitable. They are used in amounts such that the resulting polyurethane contains from 0.02 to 1% by weight of salt-like groups.

Suitable tertiary amines or their salts are tertiary amines which additionally contain two hydroxyl or two primary or secondary amino groups in the molecule.

The isocyanate groups and the hydroxyl and amino groups which are reactive with isocyanate should be used in roughly equivalent molar ratios. The ratio of the number of isocyanate groups to the total number of hydrogen atoms reactive with isocyanate should be from 0.9 to 1.2, preferably from 1.0 to 1.1.

The dihydroxy compounds having a molecular weight of from 500 to 5,000 (a), diisocyanates (b) chain extenders having a molecular weight of less than 300 (c) and water-soluble salts of aliphatic aminocarboxylic acids or aminosulfonic acids (d) should be used in molar ratios such that the ratio of component (a) to the sum of the diisocyanates (b) to the sum of the chain extenders (c) and of component (d), a:b: (c+d), is from 1:2:1 to 1:14:13, particularly advantageously from 1:4:3 to 1:10:9.

To accelerate the reaction of the diisocyanates, the conventional and known catalysts, such as dibutyltin dilaurate, tin(II) octoate or 1,4-diazabicyclo[2,2,2]-octane, may be concomitantly used.

The aqueous polyurethane dispersions are prepared in a conventional manner by reacting the dihydroxy compounds pounds having a molecular weight of from 500 to 5,000 with the diisocyanates and the chain extenders having a molecular weight of less than 300 without salt groups, in the melt or in the presence or absence of a water-miscible inert organic solvent boiling below 100° C., under atmospheric or superatmospheric pressure, to give a prepolymer having terminal isocyanate groups.

The aromatic and (cyclo)aliphatic diisocyanates to be used according to the invention can be reacted, either as a mixture with one another or in succession in the stated order, with the dihydroxy compounds and the chain extenders. Because of the different reactivities of the two diisocyanates, it is often sufficient to use the diisocyanates as a mixture with one another. If they are reacted in succession with the dihydroxy compounds and the chain extenders, it is advantageous first to use the aromatic diisocyanate and then the (cyclo)aliphatic one in order to ensure that the reaction product has middle segments of aromatic diisocyanate and chain extender and terminal (cyclo)aliphatic isocyanate groups. In the stepwise reaction of the two diisocyanates, it is not essential completely to react the aromatic diisocyanate before adding the (cyclo)aliphatic diisocyanate; instead, the (cyclo)aliphatic diisocyanate can often be added when only some of the aromatic diisocyanate has reacted.

The resulting polyurethane prepolymer having terminal aliphatic or cycloaliphatic isocyanate groups may be further diluted with a water-miscible solvent which boils below 100° C. and is inert to isocyanate groups, and water-soluble salts of aliphatic aminocarboxylic or—sulfonic acids or their salts which additionally have two or more hydrogen atoms in the molecule which are reactive with isocyanate groups are added at from 20° to 50° C. If necessary, these ionic chain extenders may be added in the form of an aqueous solution. The reaction of these salts with the isocyanate groups takes place spontaneously and leads to chain extension.

A solution of the adhesion-promoting resin in a water-miscible inert organic solvent boiling below 100° C. is then added to the solution of the polyurethane thus obtained.

Preferred adhesion-promoting resins are phenol/formaldehyde resins based on novolaks. Epoxy resins and resol types likewise give the desired effect.

The resins can be dispersed in concentrations of 5–50%. The total solids content of the dispersions can be varied up to 50%.

Finally, water is stirred into the solution of the polyurethane ionomer and resin, and the organic solvent is removed by distillation. This gives finely divided, stable dispersions which may be concentrated by evaporation if necessary. In general, solvent-free latices having a solids content of 30–50% are preferred.

Suitable low-boiling solvents are polar solvents which are inert to isocyanate, have boiling points below 100° C. and are miscible with water, for example acetone, tetrahydrofuran or methyl ethyl ketone.

The symbols used in the Examples below have the following meanings:
PE = Polyesterol of
ADA = Adipic acid
B 14 = Butane-1,4-diol
DBTL = Dibutyltin dilaurate
TDI = Toluidene diisocyanate
HDI = Hexamethylene diisocyanate
PUD = Na salt of the Michael adduct of acrylic acid and ethylene diamine (as a chain extender containing salt groups)
IPDA = Isophoronediamine

EXAMPLE 1

Starting materials:
350 g of PE ADA/B14 (molecular weight $\overline{M}w$ 2,300)
0.05 g of DBTL catalyst
94 g of acetone I
17.26 g of TDI
16.92 g of HDI
375 g of acetone II
10.35 g of PUD
170 g of phenol novolak resin
(phenol/formaldehyde condensate, $\overline{M}w$ = about 600), softening temperature = 95°–105° C.)
170 g of acetone III
805 g of H$_2$O

Procedure

TDI is added to a mixture of the dehydrated polyesterol PE, acetone I and catalyst. After a reaction time of 1 hour at 60° C., the HDI is added and the reaction is continued for a further 2 hours. After acetone II has been fed in, the resulting polymer solution has an NCO content of 0.6%. Chain extension is effected with PUD at 50° C. After 5 minutes, the phenol novolak resin, dissolved in acetone III, is admixed, and the mixture is kept at 50° C. for 5 minutes. Thereafter, dispersing is effected with water and the acetone is then distilled off.

A finely divided PUR dispersion having a solids content of 42% is obtained.

EXAMPLE 2

Starting materials:
500 g of PE ADA/B14 (molecular weight $\overline{M}w$ 2,300)
0.07 g of DBTL catalyst
134 g of acetone I
24.9 g of TDI
24.4 g of HDI
537 g of acetone II
14.81 g of PUD
242 g of Koreforte
(phenol/formaldehyde condensate, $\overline{M}w$ = about 2,000–2,800), softening temperature = 100°–150° C.)
249 g of acetone III
1,208 g of water

Procedure

TDI is added to a mixture of the dehydrated polyesterol, acetone I and catalyst. After a reaction time of 1 hour at 60° C., the HDI is added and the reaction is continued for a further 2 hours. After acetone II has been fed in, the resulting polymer solution has an NCO content of 0.6%. Chain extension is effected with PUD at 50° C. After 5 minutes, the Koreforte, dissolved in acetone III, is admixed, and the mixture is kept at 50° C. for 10 minutes. Thereafter, dispersing is effected with water and the acetone is then distilled off.

A finely divided polyurethane dispersion having a solids content of 43% is obtained.

EXAMPLE 3

Starting materials:
500 g of PE ADA/B14 (molecular weight $\overline{M}w$ 2,300)
0.08 g of DBTL catalyst
134 g of acetone I
24.9 g of TDI
24.4 g of HDI
537 g of acetone II
14.8 g of PUD
242 g of thermoplastic phenol/formaldehyde condensate, $\overline{M}w$ = about 1,000–1,600, softening temperature = about 85°–105° C.
249 g of acetone III
1,208 g of water

Procedure

A polyurethane dispersion is prepared as described in Example 2. The reaction time after the addition of HDI is 2 hours. The NCO content of the solution in acetone is 0.62%. After the addition of PUD and acetone III, dispersing is effected with water. A finely divided, stable polyurethane dispersion having a solids content of 42% is obtained.

EXAMPLE 4

Starting materials:
500 g of PE ADA/B14 (molecular weight $\overline{M}w$ 2,300)
0.07 g of DBTL catalyst
134 g of acetone I
24.9 g of TDI
24.4 g of HDI
537 g of acetone II
14.8 g of PUD
242 g of Epikote
(epichlorohydrin/bisphenol A adduct, $\overline{M}w$ = about 600–1,100, softening temperature = 85°–115° C.)
249 of acetone III
1,208 g of water

Procedure

A polymer solution in acetone is prepared as described in Example 2. The reaction time after the addition of HDI is 2 hours. The NCO content is 0.59%. Epikote is dissolved in acetone in a ratio of 1:1 and the solution is stirred in. Water is then added.

The resulting finely divided dispersion has a solids content of 41%.

EXAMPLE 5

Starting materials:
350 g of PE ADA/B14 (molecular weight $\overline{M}w$ 2,300)
0.05 g of DBTL catalyst 94 g of acetone I
17.43 g of TDI
17.08 g of HDI
376 g of acetone II
10 g of PUD
169.2 g of phenol/formaldehyde condensate, $\overline{M}w$=about 600-1,200, softening temperature 90°-110° C.)
169.2 g of acetone III
565 g of water Procedure The TDI is added to a mixture of dehydrated polyesterol PE, acetone I and catalyst. After a reaction time of 1 hour at 64° C., the HDI is added. After reaction for a further 2 hours, acetone II is added. The NCO content of the polymer solution is then 0.6%. After chain extension with PUD at 50° C., the phenol/formaldehyde condensate, dissolved in acetone III, is added, and stirring is carried out for 5 minutes at 50° C. After the addition of water, the acetone is distilled off.

The resulting finely divided dispersion has a solids content of 50%.

EXAMPLE 6

Starting materials:
350 g of PE ADA/B14 (molecular weight $\overline{M}w$ 2,300)
0.05 g of DBTL catalyst
94 g of acetone I
17.4 g of TDI
17 g of HDI
376 g of acetone II
6.9 g of PUD
3.4 g of IPDA
169 g of phenol/formaldehyde condensate as in Example 5
169 g of acetone III
381 g of water Procedure TDI is added to a mixture of PE, acetone I and catalyst. After a reaction time of 1 hour at 60° C., HDI is added. Acetone II is added, afterwhich chain extension is effected with PUD and IPDA. After 3 minutes, the phenol/formaldehyde condensate, dissolved in acetone III, is added dropwise to the solution of the polymer in acetone. Stirring is continued for 5 minutes at 50° C., water is added and the acetone is then distilled off.

The resulting finely divided dispersion has a solids content of 60%.

Adhesive properties of the dispersions prepared according to the invention (Examples 1-6)

Methods of measurement a) Peeling values on SBR1 test material, immediate values and 5-day values in N/mm without heat activation b) Heat distortion resistance in °C/N, without heat activation c) Peeling values on SBR1 test material, immediate values and 5-day values in N/mm after heat activation (T=80° C.)

d) Heat distortion resistance in °C/N after heat activation at T=80° C.

Results of measurements

| Example | (a) | (b) | (c) | (d) |
| --- | --- | --- | --- | --- |
| 1 | 2.8/2.95 | 50/20 | 3.30/3.5 | 60/20 |
| 2 | 2.4/2.7 | 50/20 | 1.5/2.4 | 50/15 |
| 3 | 1.0/1.4 | 50/5 | 0.8/2.3 | 50/5 |
| 4 | 0.9/2.6 | 50/20 | 1.0/2.8 | 50/30 |
| 5 | 1.5/2.2 | 50/25 | 2.4/3.2 | 60/10 |
| 6 | 2.7/3.1 | 50/20 | 3.2/3.6 | 60/20 |

Contact adhesion:
(Using the dispersion from Example 5, thickened with 2% of vinylpyrrolidone copolymer)

| Bonded materials | Applied pressure N/mm$^2$ | Shear strength N/mm$^2$ |
| --- | --- | --- |
| Beech plywood/Beech plywood | 0.5 | 3.0 |
| Beech plywood/Beech plywood | 7.0 | 6.3 |
| Rigid PVC/Rigid PVC | 0.5 | 2.0 |
| Aluminum/Aluminum | 0.5 | 3.0 |
| Acrylic resin/Beech plywood | 0.5 | 3.2 |
| Steel sheet/Wood | 0.5 | 1.6 |

We claim:

1. A process for the preparation of an emulsifier-free aqueous polyurethane dispersion by reacting (a) dihydroxy compounds having a molecular weight of from 500 to 5,000, (b) diisocyanates and (c) chain extenders having two or more hydrogen atoms reactive to isocyanate groups and having a molecular weight of less than 300, in the melt or in the presence of a water-miscible inert organic solvent (S) boiling below 100° C., to give a prepolymer having terminal isocyanate groups, then reacting the prepolymer, which may be dissolved in a water-miscible inert organic solvent (S), with (d) salts of aliphatic aminocarboxylic or -sulfonic acids or amino-containing or hydroxyl-containing tertiary ammonium salts, which salts may be dissolved in water, dispersing the resulting polyurethane in water, wherein from 5 to 60 parts by weight, based on 100 parts by weight of the polyurethane, of a phenol/formaldehyde or epoxy organic condensation resin which is dissolved in a solvent boiling below 100° C. is admixed before the polyurethane obtained is dispersed in water.

2. A process as claimed in claim 1, wherein the organic condensation resin used in a phenol/formaldehyde condensate.

3. A method of bonding materials, comprising applying to said materials a product obtained as claimed in claim 1, as an adhesive, and bonding said materials.

4. A process as claimed in claim 1, wherein the organic condensation resin is an epoxy condensate.

5. A process as claimed in claim 1, wherein after dispersing the polyurethane in water said organic solvent is removed by distillation.

6. A method as claimed in claim 3, wherein the organic condensation resin used in the preparation of said adhesive is a phenol/formaldehyde condensate.

7. A method as claimed in claim 3, wherein the organic condensation resin used in the preparation of said adhesive is an epoxy condensate.

8. An adhesive comprising an emulsifier-free aqueous polyurethane dispersion obtained by the process of claim 1.

* * * * *